United States Patent [19]

Rado et al.

[11] 3,906,077
[45] Sept. 16, 1975

[54] PURIFICATION OF FERRIC CHLORIDE

[75] Inventors: Theodore A. Rado, Oklahoma City; Thomas C. Nelson, Edmond, both of Okla.

[73] Assignee: Kerr-McGee Chemical Corporation, Oklahoma City, Okla.

[22] Filed: Feb. 15, 1974

[21] Appl. No.: 442,803

[52] U.S. Cl. ............... 423/149; 423/74; 423/148; 423/493; 55/71
[51] Int. Cl.² .......................................... C01G 49/10
[58] Field of Search ............ 423/149, 74, 493, 148; 55/71

[56] References Cited
UNITED STATES PATENTS

| | | | |
|---|---|---|---|
| 2,083,692 | 6/1937 | Dorph et al. | 423/493 |
| 2,533,021 | 12/1950 | Krchma | 423/149 X |
| 2,940,827 | 6/1960 | Groves | 423/149 |
| 3,218,122 | 11/1965 | Nelson et al. | 423/493 |
| 3,683,590 | 8/1972 | Dunn, Jr. | 423/493 x |
| 3,803,287 | 4/1974 | Fukushima et al. | 423/74 |

*Primary Examiner*—Edward Stern
*Attorney, Agent, or Firm*—William G. Addison

[57] ABSTRACT

The present invention relates to a process for the purification of ferric chloride. Broadly, the process comprises introducing a mixture of ferric chloride and non-volatile impurities into a treating zone maintained at an elevated pressure and temperature, said temperature being about the boiling point of the mixture at the selected pressure whereby a substantially pure ferric chloride vapor is recoverable as an overhead fraction and the non-volatile impurities are withdrawable as a slurry in a liquid ferric chloride bottoms fraction. The withdrawn slurry is heated to vaporize the ferric chloride and then introduced into a solids separator. The vaporized ferric chloride leaving the solids separator is cooled and recycled to the treating zone.

11 Claims, 1 Drawing Figure

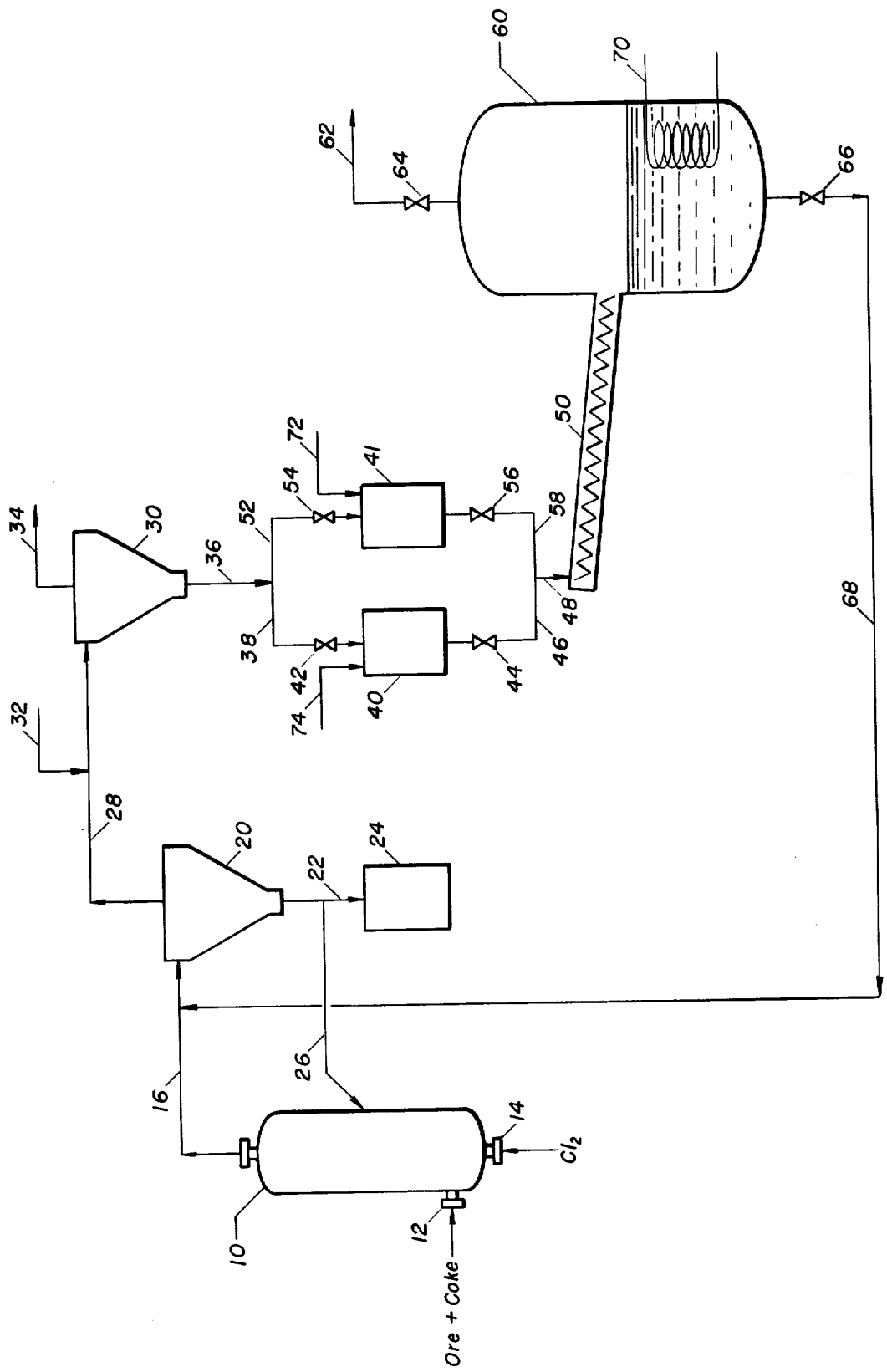

3,906,077

PURIFICATION OF FERRIC CHLORIDE

BACKGROUND OF THE INVENTION

It is known that ferric chloride is produced as a byproduct in the processing of many ores including titanium dioxide-containing ores. In the production of titanium dioxide, for example, a titaniferous material such as rutile or ilmenite ore is chlorinated in the presence of a reducing agent, usually coke. The product gases from chlorination of the titaniferous ore usually are at a temperature of from about 700° to 1100° C. and consist essentially of titanium tetrachloride, unreacted chlorine, ferric chloride and some ferrous chloride.

When the chlorination is performed in a fluid bed reactor, the product gases include non-volatile impurities comprising a finely divided suspension of ash, coke and unreacted ore. The product gases also may include other metallic chlorides depending upon the particular ore being chlorinated. Obviously, of course, it would be desirable to obtain the ferric chloride in a substantially pure form for subsequent processing such as, for example, oxidation of the ferric chloride to (1) recover the chlorine for recycle to the chlorinator and (2) simultaneously produce a non-polluting saleable iron oxide.

Various methods have been suggested heretofore for the purification of ferric chloride. In U.S. Pat. No. 2,940,827 there is suggested a method for obtaining a substantially pure ferric chloride. In accordance with the method disclosed therein, hot gases evolved from a reactor during the chlorination of an ore, such as ilmenite, are passed to a preliminary separator which removes a major portion of any unattacked materials and ash. The gases then are passed to a second separator where they are cooled below the dew-point of ferric chloride to precipitate a major part of the ferric chloride. The precipitated ferric chloride is discharged directly into a molten pool comprising a major portion of ferric chloride and at least one other normally solid salt mutually solvable with and non-reactive with ferric chloride. A portion of the molten pool is withdrawn and heated to evolve a substantially pure ferric chloride vapor.

A major disadvantage of the patented process is that it requires an additional process step to separate the ferric chloride from the insolubles entrained in the molten pool. Further, at least one additional process step is required to purify the molten pool when it becomes saturated with insolubles, such as, ash, ore and coke.

In U.S. Pat. No. 3,218,122, there is described another method for the purification of an impure ferric chloride containing carbonaceous materials and titanium dioxide. The method comprises melting the impure ferric chloride in a container at a temperature of from about 305° to about 475° C. and allowing the melted ferric chloride to stand until a significant amount of the solid carbonaceous impurities migrate to the upper portion and a significant amount of any titanium dioxide containing material migrates to a lower part thereof. A liquid ferric chloride substantially free of impurities then is withdrawable as a fluid from the middle portion of the container.

A disadvantage of this process, however, is that the impurities at the upper and lower portions of the container are not readily withdrawable and being solids tend to plug the lines. Another disadvantage of this process is that it generally requires a residence time of from 1 to 3 hours to effect a separation of the ferric chloride from the impurities.

It also will be apparent that a considerable amount of ferric chloride will be entrained in the interstices of the solids. Absent a secondary recovery process, such interstitial ferric chloride will be lost from the system and present a potential pollution problem.

More recently, in U.S. Pat. No. 3,628,913, there is suggested another method of separating iron chloride from the effluent gases of a titaniferous ore chlorination process. The effluent gases are maintained at a temperature at least 23° C. above the ferrous chloride dew-point (approximately 700°–900° C.) while they are transferred through a duct to a condensing unit. In the condensing unit, the effluent gases are contacted with liquid titanium tetrachloride which is vaporized and cools the gases to produce solid ferrous chloride and ferric chloride and gaseous titanium tetrachloride. Obviously this method results in a mixture of ferric and ferrous chloride rather than substantially pure ferric chloride. Further, such mixture also would contain any ore, coke and ash entrained in the effluent gases.

SUMMARY OF THE INVENTION

Broadly, the present method provides a continuous process for recovering substantially pure ferric chloride from a substantially anhydrous mixture of ferric chloride and non-volatile impurities. The method comprises introducing a mixture of ferric chloride and non-volatile impurities into a treatment zone. The treatment zone is maintained at a temperature within the range of from about 350° to 700° C. and under a pressure of from above atmospheric up to about 50 atmospheres. The pressure and temperature are so selected as to provide a liquid-vapor interface in the treatment zone. The temperature is within about 10° C. of the boiling point of the mixture at the selected pressure. An overhead fraction comprising substantially pure ferric chloride vapor is withdrawn from an upper portion of the treatment zone. A bottoms fraction comprising a slurry of the non-volatile impurities in liquid ferric chloride is withdrawn from a lower portion of the treatment zone.

It is an essential feature of the present invention that the non-volatile solids content of the bottoms fraction must not exceed about 20 percent by weight. The desired solids content of the bottoms fraction is controlled by withdrawing a portion of the slurry and heating it to vaporize the ferric chloride and then introducing it into a solids separator where a major portion of the coke, ore and other non-volatile impurites are removed. The vaporized ferric chloride is recovered from the solids separator, cooled to solid phase ferric chloride and recycled to the treatment zone.

BRIEF DESCRIPTION OF THE DRAWING

The drawing depicts a schematic representation of the process of the present invention in conjunction with an ore chlorination process.

DETAILED DESCRIPTION OF THE DRAWING

The present invention provides a process for obtaining substantially pure ferric chloride from a mixture of the same and non-volatile impurities. The process is particularly adapted, but not limited, to the purification of ferric chloride produced as a byproduct in the chlorination of a titaniferous ore.

Referring to the drawing, a mixture of ground titaniferous ore containing iron and a finely divided solid carbonaceous fuel such as coke is introduced through an inlet 12 into a chlorinator designated generally by the reference 10. The chlorinator preferably is of the fluid bed type. Chlorine gas enters the chlorinator through gas inlet port 14. The chlorine is supplied in at least about the amount of that theoretically required to chlorinate all the metals present in the ore. The chlorine, coke and ore are reacted within the chlorinator under anhydrous conditions at a temperature of from about 900° to 1200° C. to produce a substantially moisture free effluent gas comprising oxides of carbon, titanium tetrachloride, iron chlorides, trace amounts of other metal chlorides and non-volatile solid impurities, such as, unreacted ore, ash, coke and the like. The purpose of supplying at least about the theoretical amount of chlorine is, of course, to substantially eliminate the presence of ferrous chloride in the product gases.

The gaseous effluent is withdrawn from an upper portion of chlorinator 10 through conduit 16 and introduced into a hot solids separation zone designated generally by the reference numeral 20 which may be, for example, a cyclone separator. The term hot solids separation zone as used herein contemplates a solids separation zone wherein the temperature of the gaseous effluent is above the dew-point of ferric chloride. In separation zone 20 a major amount of the non-volatile solids are separated from the effluent gas and passed through conduit 22 to a storage bin 24. Alternatively, the solids may be reintroduced into chlorinator 10 via conduit 26.

From separation zone 20, the effluent gases, now containing a minor part of the original non-volatile solids, are cooled to precipitate the ferric chloride as a particulate solid. In accordance with the cooling method depicted in the drawing the gases pass through conduit 28, and a cooling liquid having a dew-point lower than that of ferric chloride is introduced via conduit 32. The liquid preferably is injected as a spray which is vaporized by the hot effluent gases. A sufficient quantity of the liquid is injected into the gases to reduce their temperature to at least the dew-point of ferric chloride and preferably about 30° to 50° C. below the ferric chloride dew-point, whereby the ferric chloride is precipitated as a particulate solid in the gas stream. When the ore being chlorinated is a titaniferous ore, it ia advantageous to use liquid titanium tetrachloride as the cooling liquid.

The gas stream then enters a cold solids separation zone designated generally by the reference numeral 30 which preferably is another cyclone separator. In separation zone 30 the particulate solid ferric chloride and non-volatile solid impurities are removed from the gas stream. The solids-free gas stream comprising, for example, the oxides of carbon, titanium tetrachloride and a small amount of other metal chlorides, leaves separation zone 30 through conduit 34 for subsequent processing.

The particulate solid ferric chloride and non-volatile solid impurities are discharged from separation zone 30 via conduit 36 into one or the other of storage vessels 40 and 41 according to the setting of valves 42 and 54 respectively. For example, valves 44, 54 and 56 initially are closed and valve 42 is open whereby the particulate solid ferric chloride and non-volatile solid impurities pass from conduit 36 through conduit 38 and into storage vessel 40. When the desired amount of solids has been introduced into storage vessel 40, valve 42 is closed and valve 54 is opened to begin filling storage vessel 41. Valve 44 is opened and the solid material from storage vessel 40 is passed through conduit 46 and 48 to a solids feeder 50 which may be, for example, a screw-conveyor. Advantageously, the solids are transferred under pressure such as, for example, by introducing a gas such as nitrogen or chlorine into the appropriate storage vessel via conduits 72 or 74.

The solids feeder 50 conveys the particulate ferric chloride and non-volatile solid impurites into a ferric chloride treatment zone, designated generally by the reference numeral 60, which is provided with valved outletd 64 and 66 at its upper and lower portions, respectively. Treatment zone 60 is provided with heating means 70 such as, for example, an electrical heater, to maintain the mixture of ferric chloride and non-volatile impurities at a desired elevated temperature. Alternatively, the treatment zone may be heated indirectly by a gas fire and the like.

In accordance with the present invention, the temperature and pressure within treatment zone 60 are maintained so as to provide a liquid-vapor interface within the treatment zone, thus, providing an overhead fraction comprising substantially pure ferric chloride vapor and a bottoms fraction comprising a slurry of the non-volatile impurities in liquid ferric chloride. The treatment zone 60 may be maintained at any temperature and pressure above the triple point (the temperature and pressure at which the mixture may exist as solid, liquid and vapor) and below the critical temperature and pressure of the mixture. The pressure generally is maintained in the range of from about 1.2 to 50 atmospheres and preferably is from about 2 to 4 atmospheres.

The temperature within the treatment zone 60 must be maintained sufficiently high to continuously produce a substantially pure ferric chloride vapor. Such temperature generally will be within the range of from about 300° up to about 700° C.

It will be appreciated by those versed in the art that the specific temperature selected to provide the liquid-vapor interface may vary considerably. Specifically, at temperatures below the boiling point of the mixture there will exist a vapor pressure comprising substantially pure ferric chloride. It is possible to recover a substantial quantity of ferric chloride vapor by introducing into the treatment zone 60 another gas, which must be non-reactive with respect to the constituents within treatment zone 60 and further, must have a higher vapor pressure than ferric chloride at the selected pressure and temperature within the treatment zone. By the introduction of such other gas, an equalibrium mixture rich in ferric chloride is formed. The other gas and the gaseous ferric chloride then are recovered and readily separable such as, for example, by distillation. Examples of suitable gases include nitrogen, helium, chlorine and the like. Chlorine is a preferred gas.

When operating below the boiling point of the mixture, however, it also is necessary to maintain the mixture in an agitated state to prevent settlement of the non-volatile solids contained therein. Such agitation may be accomplished by a mechanical agitator such as a paddle stirrer and the like. Generally it is preferred to provide the agitation by bubbling a gas through the liquid mixture. Suitable gases for agitation include nitrogen, helium, chlorine, and the like or mixtures thereof.

In the interest of economy, it generally is preferred to operate at or at least about the boiling point of the mixture. By operating at the boiling point a maximum quantity of ferric chloride vapor is produced and no auxillary means is required to maintain the liquid ferric chloride agitated. Obviously, of course, the boiling point of the mixture will be a function of the pressure in the separation zone and the composition and quantity of the impurities present. The preferred operating conditions are a temperature in the range of from about 320° to 420° C. and a pressure of from about 2 to 4 atmospheres. The temperature is selected to be from about 10° C. below the boiling temperature of the mixture up to the boiling temperature of the mixture and preferably is at the boiling temperature.

It also is an important feature of the present invention that the bottoms fraction by a readily withdrawable and pumpable liquid. This feature is accomplished by maintaining the solids content of the liquid ferric chloride below about 20 percent by weight. Generally, the solids content of the ferric chloride slurry should not exceed about 12 percent by weight.

To maintain the desired solids content it is necessary to withdraw a portion of the liquid containing non-volatile impurities via valve 66 and conduit 68. Advantageously, the withdrawn portion of liquid ferric chloride and non-volatile impurities are heated by introduction (preferably sprayed) into conduit 16, where the ferric chloride is heated and vaporized by the hot effluent gases from chlorinator 10, and then enter the hot solids separation zone 20 where a major portion of the non-volatile solids are removed.

The withdrawn portion of ferric chloride and non-volatile impurities could be introduced into the chlorinator, however, that would necessitate expending the thermal energy required to heat the withdrawn portion to the chlorination temperature. By introducing the withdrawn portion into the chlorinator effluent gases, the temperature of the chlorinator effluent gases is reduced, thus, reducing the amount of liquid titanium tetrachloride subsequently required to precipitate the ferric chloride. The vaporized ferric chloride is recycled to treatment zone 60 in the manner hereinbefore described.

The solids content of treating zone 60 is readily determinable by various means. The solids content is determinable, for example, using a magnetic flow meter on the slurry recycle line 68. The flowmeter readings are directly relatable to the solids content of the slurry. Alternatively, treatment zone 60 could be provided with a density sensing device since the solids content of the slurry is density relatable.

These and other techniques will be readily apparent to those versed in the art. Advantageously, of course, the solids content determining apparatus would provide an output signal which could be sent to a controller to automatically adjust valve 66 and maintain the desired solids content in the slurry.

The overhead fraction comprises substantially pure ferric chloride vapor and may be withdrawn via valve 64 and conduit 62 for use without further processing. It may be used, for example, as a feed to an oxidation process to produce ferric oxide and chlorine. In some instances, it may be desirable to remove the ferric chloride vapor from the upper portion of treatment zone 60 and process such vapor through a distillation column to remove any minor amounts of volatile impurities which may be present such as aluminum chloride, vanadium chloride, stannic chloride and the like.

It is an advantage of the present invention that the purification of the ferric chloride takes place rapidly. The average residence time of the ferric chloride in treatment zone 60 is from about 30 to 120 minutes. Indeed, when the mixture of ferric chloride and non-volatile impurities are maintained at a pressure of about 2 atmospheres and at the boiling point of the mixture, the average residence time is only about 60 minutes. Further, the present invention provides a continuous process whereby it is possible to obtain substantially complete recovery of all the ferric chloride produced essentially free of impurities.

The following example is illustrative of the invention and is not to be construed as a limitation thereof. All parts and percentages referred to are by weight unless otherwise indicated.

EXAMPLE

This example demonstrates the application of the process of the present invention in use in conjunction with the chlorination of a titaniferous ore substantially as depicted in the drawing. A finely ground mixture of coke and a titaniferous ore (ilmenite) are introduced into a chlorinator of the type disclosed in U.S. Pat. No. 3,238,023 at the rate of 48 and 166 lb/hr respectively. Chlorine and oxygen also are introduced into the chlorinator at a rate of about 250 lb/hr and 16lb/hr respectively. The temperature in the chlorinator is maintained at about 1000° C. The hot product gases leave the chlorinator at a temperature of 850° C. and a rate of 484 lb/hr. The product gases on analysis are found to have the following composition.

| Constituent | Weight percent |
| --- | --- |
| $N_2$* | 5.7 |
| $TiCl_4$ | 39.7 |
| CO | 8.2 |
| $CO_2$ | 12.8 |
| $FeCl_3$ | 33.5 |

*Nitrogen is used as a purge gas to keep the coke and ore dry. A small amount of nitrogen is entrained in the coke and ore, and shows up in the product gas analysis.

The gases enter a first cyclone separator where a major portion of the non-volatile solids comprising ash, coke, and ore are removed at a rate of approximately 39.7 lb/hr. The hot gases, containing the remaining minor amount of the non-volatile solids, leaving the first cyclone separator then are contacted with a spray of liquid titanium tetrachloride in an amount sufficient to reduce the gas temperature to about 182° C. thereby precipitating the ferric chloride as a solid and vaporizing the titanium tetrachloride. The gases and solid ferric chloride enter a second cyclone separator where the solid ferric chloride and substantially all of the remaining non-volatile solids are separated from the gas at a rate of about 269.3 lb/hr. On analysis the composition of the separated solids is found to be as follows:

| Constituent | Weight percent |
| --- | --- |
| FeCl$_3$ | 94 |
| Ore (TiFeO$_3$) | 3.3 |
| Coke | 2.2 |
| Misc. other metal chlorides | 0.5 |

The separated solids are introduced into a ferric chloride treatment zone comprising a carbon steel pressure vessel having a volumetric capacity of about 100 gallons. The contents of the vessel are maintained at a temperature of about 350° C. and under a pressure of about 30 PSIA thereby forming a liquid-vapor interface comprising a substantially pure ferric chloride vapor and a slurry of the non-volatile solids in liquid ferric chloride.

An overhead fraction comprising the substantially pure ferric chloride in a vapor phase is withdrawn at a rate of 162 lb/hr and on analysis is found to comprise approximately 98% FeCl$_3$ and 2% Cl$_2$.

A bottoms fraction comprising a slurry of the non-volatile solids in liquid ferric chloride is withdrawn at a rate of about 107.3lb./hr to maintain the solids content of the bottom fraction at less than about 12 percent by weight. The withdrawn slurry is recycled to the first cyclone separator for removal of a major amount of the non-volatile solids.

The present invention, thus, provides a continuous process for recovering a substantially pure ferric chloride from a mixture of the same and non-volatile impurities.

What is claimed is:

1. In a process wherein an iron containing ore is chlorinated in a fluid bed reactor to produce an effluent gaseous mixture including ferric chloride and non-volatile impurities, the improvements for recovering substantially pure ferric chloride from said gaseous mixture comprising the steps of:
   a. introducing the mixture into a hot solids separation zone at a temperature above the dew-point of ferric chloride wherein a major portion of the non-volatile impurities are removed,
   b. withdrawing the gaseous mixture containing a minor portion of the non-volatile impurities,
   c. cooling said gaseous mixture to a temperature below the dew-point of ferric chloride whereby the ferric chloride is precipitated as a solid,
   d. introducing the gaseous mixture into a cold solids separation zone wherein the ferric chloride and non-volatile impurities are removed from the gas,
   e. introducing the solid ferric chloride and non-volatile impurities into a treatment zone,
   f. maintaining the treatment zone at a temperature within a range of from about 300° to about 700°C. and at a pressure of from about 1.2 to 50 atmospheres, said temperature being within about 10°C. of the boiling point of the mixture, at the selected pressure, to provide a liquid-vapor interface within the treatment zone,
   g. maintaining the liquid in an agitated state in the treatment zone to prevent settling of non-volatile impurities and form a slurry of the non-volatile impurities in liquid ferric chloride,
   h. withdrawing the slurry of non-volatile impurities and liquid ferric chloride from the treatment zone at a rate sufficient to maintain the solids content of the slurry below about 20 percent by weight, and recycling the slurry to the hot solids separation zone and,
   i. recovering an overhead fraction from the treatment zone comprising substantially pure ferric chloride vapor.

2. The process of claim 1 wherein the temperature of the mixture in the treatment zone is at the boiling point of the mixture.

3. The process of claim 1 wherein the pressure in the treatment zone is from about 2–4 atmospheres.

4. The process of claim 1 wherein the temperature of the mixture in the treatment zone is at the boiling point of the mixture and the pressure in the treatment zone is maintained at from about 2 to 4 atmospheres.

5. The process of claim 4 wherein the solids content of the slurry in the treatment zone is maintained below about 12 percent by weight.

6. The process of claim 1 wherein the solids content of the slurry in the treatment zone is maintained below about 12 percent by weight.

7. The process of claim 1 wherein the iron containing ore is a titaniferous ore.

8. The process of claim 7 wherein the titaniferous ore is ilmenite.

9. The process of claim 7 wherein the treatment zone is maintained at a pressure of from about 2 to 4 atmospheres and the temperature of the mixture in the treatment zone is at the boiling point of the mixture.

10. The process of claim 9 wherein the solids content of the slurry in the treatment zone is maintained below about 12 percent by weight.

11. The process of claim 1 in which at least one inert gas is introduced into the mixture in the treatment zone.

* * * * *